Warren C. Burgess, Jr.
INVENTOR.

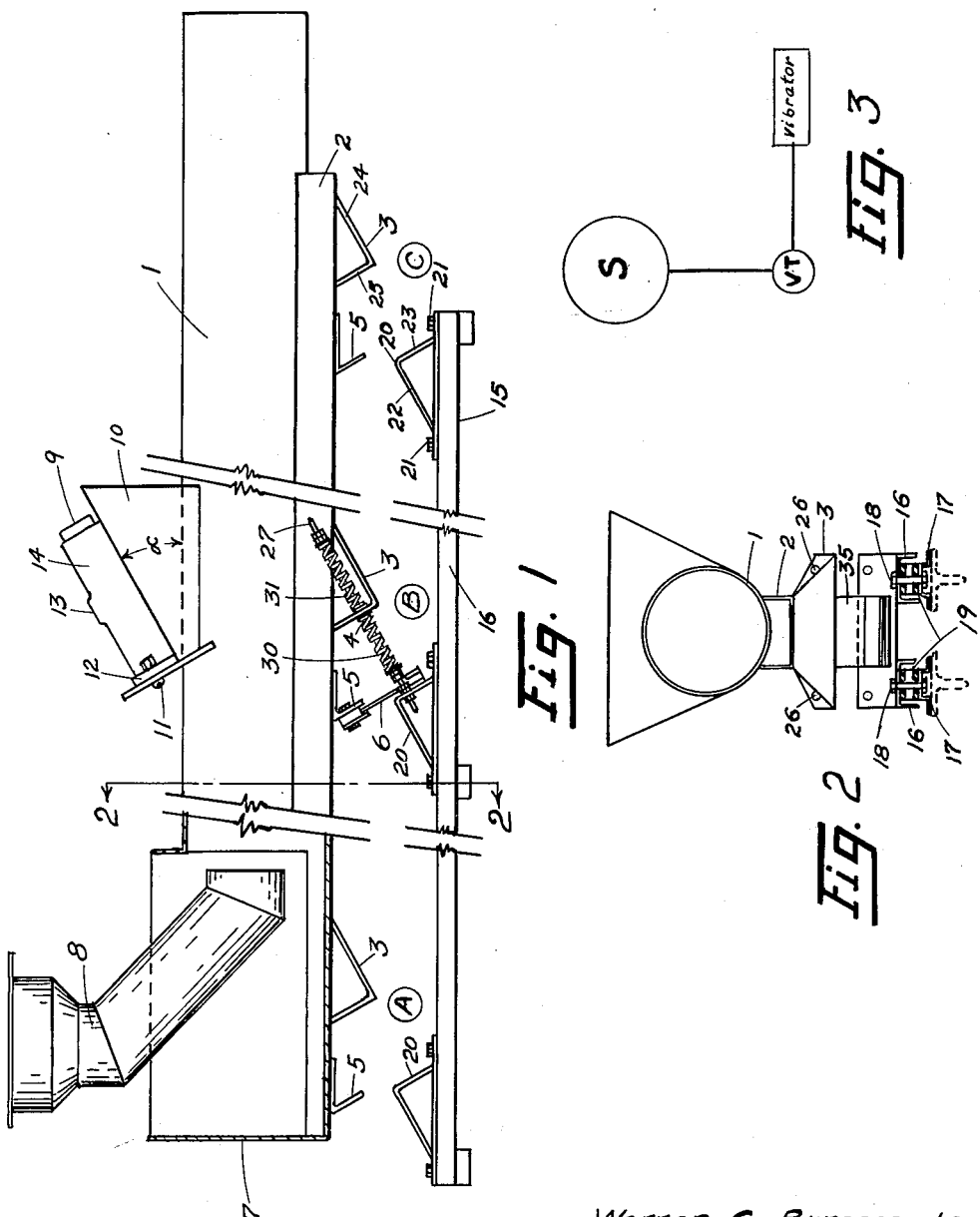
Warren C. Burgess, Jr.
INVENTOR.
BY Robert A. Sturges
ATTORNEY

United States Patent Office 2,985,279
Patented May 23, 1961

2,985,279

HIGH ENERGY LEVEL UNIDIRECTIONAL VIBRATORY DRIVE SYSTEM

Warren C. Burgess, Jr., 4972 Grace Road, North Olmsted, Ohio

Filed July 3, 1957, Ser. No. 669,863

16 Claims. (Cl. 198—220)

This invention relates, as indicated, to an improved vibratory drive system for use in testing devices, or industrial vibratory equipment, such as, vibratory conveyors and vibratory screens. More particularly, this invention is concerned with a novel combination of certain elements, principal among which are a pneumatic unidirectional vibration-inducing device, a driven member guided for unidirectional or reciprocatory motion, and matched opposed coil springs having the same natural frequency, which combination enables operation at energy levels not heretofore attainable.

Vibratory conveyors, screens and test equipment have usually been supported and guided by leaf springs. With such support or guide means, the energy level at which the equipment can be operated is limited. For example, one of the very difficult materials to convey by vibratory means at a high delivery rate is silica flour in very finely divided state, e.g., 1–10 microns. In one application to the problem of conveying silica flour by vibratory means, a tube 8 inches in diameter and 8 feet long secured to a bed and provided with hopper means (see indicated members in Fig. 1 annexed) was supported at three points using pairs of thin, high quality leaf springs having rounded edges, i.e., the best leaf spring design known. At a delivery rate of 1 lb. of silica flour per second, this system would apparently operate indefinitely. At a rate of 1.5 lbs. per second, 4 to 5 million cycles were achieved before spring failure. At a rate of 2 lbs. per second, spring failure due to fatigue occurred at about 500,000 cycles. Any feed rate above 2 lbs. per second caused fatigue failure of the leaf springs at between about 300,000 and about 500,000 cycles. The conveyor in these tests was driven by a pneumatic vibration-inducing device of variable frequency. Variation of the frequency and hence the load delivery rate was achieved by varying the gas supply pressure to the pneumatic vibration-inducing device.

There is, therefore, a definite energy level limit in leaf spring devices beyond which one cannot operate without encountering early spring failure. By this is meant that such a spring guiding and driving system could not absorb and release indefinitely without breaking, the energy demands of the system in excess of a certain amount.

It is a principal object of the present invention, therefore, to provide a vibratory drive apparatus which will enable operation at higher energy levels than heretofore possible without early spring failure.

In further tests with leaf spring systems, a form was provided to receive the spring at its maximum deflection on each side of the stroke. The purpose of this form was to eliminate, insofar as possible, what are known as concentrated stresses and reducing the reverse stresses (see "Elements of Strength of Materials," Timoshenko and MacCullough, page 317, 2d edition, 1940). Again, even with means to control such stresses, there was notch fatigue failure at the clamps at about 500,000 cycles at the 2 lb. per second delivery rate.

It is a further object of this invention to minimize reverse and concentrated stresses as a limiting factor in designing vibratory equipment.

In the operation of prior devices, there has always been an operational limit for the particular vibration-inducer-energy storage and releasing means. Optimum operating conditions are achieved when the frequency of the vibration-inducing device corresponds most nearly with the natural frequency of the springs upon which the vibrated member is carried. The natural frequency of the flat spring of the prior art is dependent upon its dimensions and its operative environment. A system of flat springs of given length, width and thickness, attached to a given movable weight, has a specific natural frequency. If the load, and its consequent driving power, is increased, one cannot increase the number of similar springs to absorb the added amount of energy without changing the natural frequency of the system. If it is necessary to operate within a certain fixed frequency level, for example, one between 1,000 and 2,000 cycles per minute, utilizing flat springs, one is limited by the spring geometry in obtaining a natural frequency within that range. With the flat spring, there appears to be a narrow band of frequencies at which optimum results are obtained. The strength of the springs is, of course, limited, and correlation of the geometric requirements for efficient operation, and the size requirements for the desired energy level may be impossible. At these frequencies, there is an energy level limit beyond which the given spring system cannot operate indefinitely.

With coil springs, it appears that any number of additional springs can be added such that in operation there is no substantial change in the natural frequency of the system, assuming that all of the springs have the same natural frequency. Thus, the load capacity in a coil spring suspended system can be made to be substantially independent of the natural frequency of the springs contrary to the situation obtaining in the cast of a flat spring.

In a series of tests using a given vibrated member supported on leaf springs, all factors were kept constant except the natural frequency of the leaf springs. This was varied by changing only the length of the springs. The device was powered by a pneumatic vibrator of variable frequency. The vibrated member was again an 8 inch diameter steel tube, 8 feet long with hopper means, secured to a channel bar as a bed (see this portion of Fig. 1, annexed hereto). With springs of a given natural frequency, the load delivery rate would rise with increasing applied frequency to its optimum at natural frequency. A series of curves at different natural frequencies was obtained showing increasing optimum deliveries with increasing natural frequencies. This behavior continued up to a point for a given material beyond which any increase in natural frequency resulted in failure at a given delivery level, or work level. It was thus found that with leaf springs there is a maximum natural frequency which can be obtained yielding an optimum delivery rate. This delivery rate for certain materials is below that which is oftentimes industrially desired. Any attempt to exceed this energy level in a given trough with leaf springs in order to meet such industrial demands results in failure of the springs due to fatigue.

It is another object of this invention, therefore, to make available a vibratory drive apparatus capable of operating at energy levels suitable to meet industrial requirements in excess of those capable of being handled by a flat spring system.

By utilizing the combination of coil springs in matched opposed pairs with a variable frequency gas fed pneumatic vibration-inducing device, natural frequency becomes substantially independent of load, it having been found that any number of additional coil springs can be added to the system to meet the requirements of added load without substantially changing the natural frequency of the assembly. Thus the load is made practically independent of frequency. Moreover, it has been found that with the variable frequency pneumatic vibration-inducing device used in combination with the matched opposed coil springs, it is possible to select frequencies which will cause the load delivery rate to vary within desirable limits. The importance of operating at or near natural frequency is simply this. Where a spring is vibrating at a frequency different from its natural frequency, portions of the spring are cancelling out the effect of other portions and the over-all amplitude of vibration is diminished. With a coil spring system, the curve of the magnification factor versus frequency ratio is flatter than with a leaf spring. At natural frequency, the amplitude of vibration is at its maximum, and it is under this condition that the system operates most efficiently. It is believed that coil springs have a heretofore unused property of a relatively flat magnification factor curve. In addition to being able to vary the frequency of the vibration-inducing means through the use of a pneumatic device, it is now possible to operate under near optimum conditions over a range of frequencies and thus obtain a range of deliveries under nearly optimum conditions.

It is another principal object of this invention, therefore, to provide an improved vibraory drive system in which the frequency of vibration may be varied.

It is another principal object of this invention to provide a vibratory drive system in which the load delivery rate is a function of a variable frequency, and in which system delivery may be accomplished under nearly optimum conditions. In the prior art devices utilizing leaf springs, the practice frequently has been to utilize the leaf springs in a three-fold capacity; namely, those of (1) guiding the vibrated member along its reciprocatory path, (2) supporting the vertical load of the vibrated body and any material that may be carried thereon, and (3) storing and releasing energy. In certain improved embodiments of the present invention, there is provided a system wherein the energy storage and release means are separated from the guide and weight supporting means. While the coil spring assembly may, in the lighter weight applications, serve also as a guide and support means, in the heavier applications very large coil springs might become necessary to serve the dual capacity of load supporting and energy storage and release. Actually, for the energy storage and release function, it has been found that the springs need only to serve in this single capacity. Hence, even in heavy devices, springs may be used which would be too small to serve in both capacities of load supporting, and energy storage and release, but for the fact that these two ends are served by separate means. The vertical component of weight may be carried conveniently upon a special bracket used in combination with the opposed spring system. Thus, substantially the entire function of the coil springs in these improved embodiments may be utilized in securing maximum vibratory performance rather than having a portion of the spring's utility diverted to support of dead weight.

It is a further object of this invention, therefore, to provide in certain instances a means whereby the necessary functions of load supporting and energy storage and release are divided and handled by separate means.

It has further been found that improved operation can be secured by oscillating the vibrated member back and forth along a single path. Thus, a point on the vibrated member when the device is in operation describes substantially a line or a linear path. For purposes of this invention, the motion will be referred to as "unidirectional," although it is recognized that since in certain instances the vibrated member oscillates at the end of a plate, the base retaining means being fixedly attached to the base and securing the end of such plate, the path is actually arcuate. In normal operation, however, the length of this segment of the arc is so small with respect to its radius that for all practical purposes the path may be regarded as a straight line.

Certain of the prior art devices employing coil springs in opposed pairs are driven in a plurality of directions so as to impart a cyclic path through which any point on the vibrated member must pass. It has been found that there can be eliminated any additional vibration-inducing devices or equipment in a system which allows for the variation of the frequency, such as in the present system. Instead of compound motion being imparted to the vibrated member with its attendant complexities and additional equipment requirements, there can now be accomplished by a unidirectional device with a single vibration-inducing mechanism advantages which exceed even those obtainable with plural direction vibratory mechanisms. One of the problems with plural direction devices of the type herein contemplated is that many times the direction of the additional motion component is such that the resultant of the two components of motion is in a direction opposite to that in which it is sought to transport material. Thus, at certain stages in the operation of plural direction devices, absent very careful control, the material backs up or tends to back up or is retarded, thereby introducing irregularities in the delivery. Moreover, when applied forces are cyclic, or, in any case, in more than one direction, it is virtually impossible to design a light weight vibrated member of any useful length which will not undergo flexure. To prevent this flexure, which introduces additional undesirable components of motion over an elongated path, for example, it has been necessary to "beef up" such troughs. Any weight fixedly attached to the moving system cuts down the efficiency.

It is another object of this invention to provide elongated vibratory trough carrying apparatus which is so constructed as to make unnecessary utilization of special means for preventing undesirable flexure.

It is still another object of this invention to minimize the problem of superimposed motions which may in some cases cause reverse or retarded flow.

It is still another principal object of the present invention, therefore, to provide a vibratory drive apparatus which enables much more accurate control of delivery rates than heretofore obtainable.

Still other objects of this invention will appear as the description proceeds.

To the accomplishment of the foregoing and related ends, said invention, then, consists of the means hereinafter fully described and particularly pointed out in the appended claims, the following description and annexed drawings setting forth in detail certain illustrative embodiments of the invention, such disclosed means constituting, however, but a few of the various forms in which the principle of this invention may be employed.

Broadly stated, therefore, this invention is in the provision of a unidirectional variable frequency vibratory drive apparatus comprising a vibratable member, a pressurized gas driven unidirectional vibration-inducing device attached directly to said vibratable member, and a base, said vibratable member having means for unidirectionally guiding it, and said vibratable member being disposed between pairs of matched opposed coil springs having the same natural frequency, the axes of which are disposed in the same direction, said springs being supported from the base.

Attention is directed to the accompanying drawings in which:

Fig. 1 is a substantial diagrammatical side elevational view of a unidirectional variable frequency vibratory conveyor in accordance with this invention.

Fig. 2 is a cross-sectional view taken on the line 2—2 of Fig. 1.

Fig. 3 is a diagrammatic illustration of an operative system for driving a pneumatic vibrator of the type here described.

Figure 4:
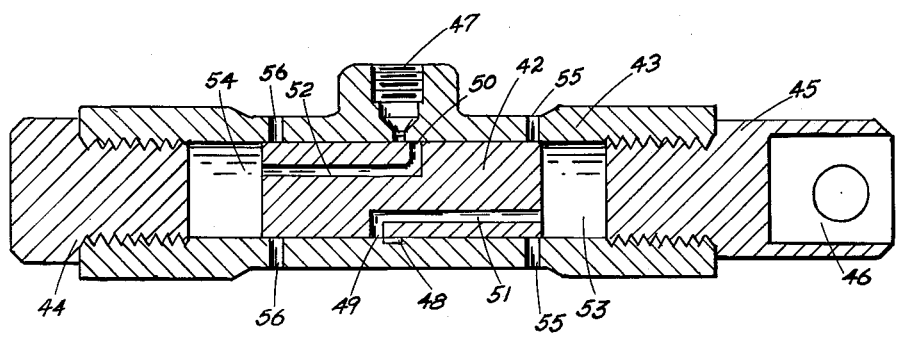
Fig. 4 is an axial cross-sectional view of a pneumatic vibrator suitable for use in accordance herewith.

Referring now more particularly to Fig. 1, there is here shown in substantial diagrammatic form a side view, partially cut away, of a unidirectional variable frequency vibratory drive apparatus embodied in a tubular vibratory conveyor. The conveyor illustrated in Figs. 1 and 2 is composed of a tubular trough 1 fixedly mounted on a suitable movable bed 2 as by welding. The combination of the trough 1 and the bed 2 constitute a vibratable member, which can, of course, take any desired form. Depending from the movable bed 2 are a plurality of crosshead members 3 which, as shown in Fig. 2, extend laterally beyond the width of the moving bed 2 in order to freely receive the energy storage and releasing means generally indicated at 4. To the rear of the crosshead members 3, considering the right hand end of the tube 1 as the forward or delivery end of the device shown in Fig. 1, are a like number of brackets 5 adapted to receive and retain the supporting and guiding means generally indicated at 6. The details reproduced in the central section B of Fig. 1 have not been shown in the terminal portions since the details are identical for the several stations designated A, B and C in Fig. 1.

Above station A is shown in diagrammatic form a material-receiving bin 7 and hopper means 8 leading into the conveyor. This particular portion of the conveyor of Fig. 1 forms no part of the invention here claimed and is illustrated solely for the purpose of showing a complete embodiment. Any suitable means for delivering material from storage to the conveyor may be employed.

Also mounted directly on the movable portion of the device shown in Fig. 1 is a penumatic unidirectional free piston type vibration-inducing device 9, the details of one form of which are more particularly shown in Fig. 4. The vibration-inducer 9 is securely fastened to the tube 1 by any suitable bracket means 10 and suitable retaining means, such as, bolt 11 piercing flange 12. Direct attachment of the vibration-inducing device 9 to the vibrated member 1 is preferred to indirect linking mechanisms because of the reduction of mass undergoing motion, the minimizing of mechanical energy consumption by the springs, and the obtaining of optimum energy application. Factors which diminish and waste the potential energy of the system have been minimized in the present structure resulting in better utilization of a lesser energy input and accomplishment of heretofore unattainable delivery rates for a given trough size. Gas under pressure is introduced to this form of the vibration-inducing device 9 at 13, using an open-ended system such as set forth in Fig. 3. The cylinder 14 carries a free piston which moves back and forth within the cylinder 14 along a path coinciding with the longitudinal axis of the vibration-inducing device 9. The bracket 10 supports the vibration-inducing device 9 at a suitable angle alpha to the longitudinal axis of the tubular trough 1. For most purposes, this angle has been found to be from between about 5° to about 75° to the horizontal. The magnitude of the angle alpha is not critical, the purpose being to impart a "throw" to the device which will effect a travelling from left to right of the material carried by the conveyor as shown in Fig. 1. In the particular and preferred embodiment shown in Fig. 1, the angle alpha is 30°. Obviously, the direction of "throw" lies also in a vertical plane passing through the axis of the tubular trough.

The preceding description has been concerned with the movable and feed portions of the conveyor. There is also provided a suitable base 15 composed, for example, of a pair of inverted channel bars 16 adapted to be bolted to a fixed bed generally shown at 17 in Fig. 2 by bolts 18. Suitable cushioning means 19, e.g., rubber, may be supplied if desired. Suitably affixed to and disposed across the pair of channel bars 16, and rearwardly displaced with respect to the crosshead members 3, are an equal number of brackets 20. Such brackets 20 may be affixed as by bolts 21 to the channel members 16, or welded, as desired. Both the crossheads 3 and the brackets 20 may be made from 90° angle iron having one face twice as long as the other face. When affixed in the manner shown in Fig. 1, there is obtained, then, a relationship between the attached member (3 or 20) and the member to which it is attached (2 or 16) of 30° and 60° respectively. Adjustment of the length faces 22 and 23, for example, and faces 24 and 25 to obtain suitable angular relationship with the supporting members is, of course, well understood.

Figure 5:
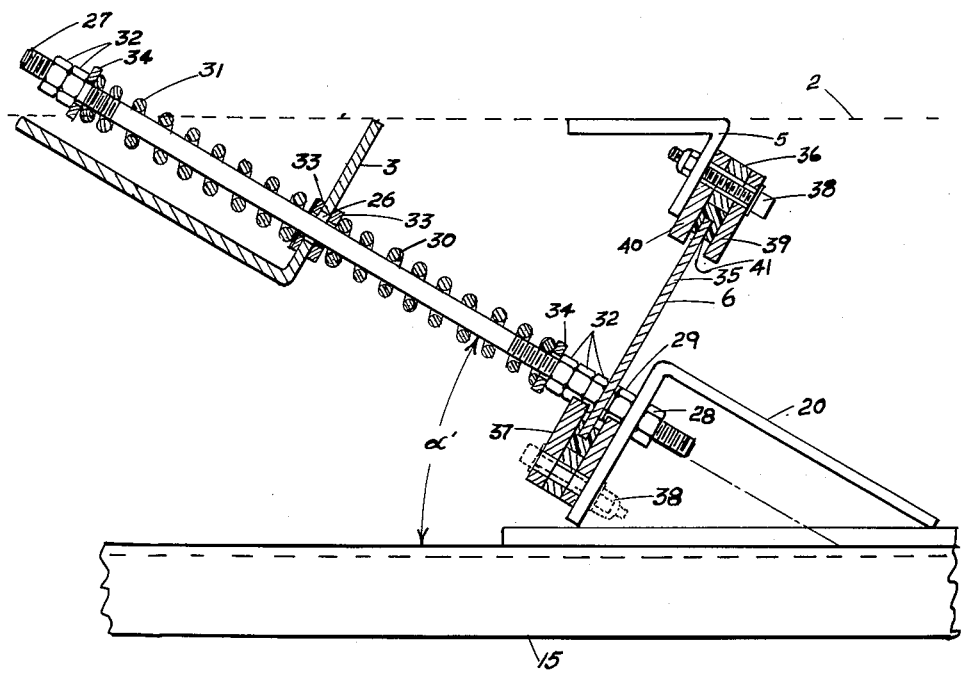
Fig. 5 is a detailed cross-sectional view with plane of the section shifted for clarity showing guide and support means and the energy storage and release means.

Each of the crossheads 3 is pierced at two points, 26, the transverse distance between the two points being greater than the width of the movable bed 2 as shown in Fig. 2. The holes 26 are adapted to receive a bar 27; the right hand and upper end of which, as shown in Fig. 1 and more particularly shown in Fig. 5, is free and the lower left hand end of which is suitably affixed to the bracket 20 as by nuts 28 and 29 embracing the bracket 20, which is in turn attached to the bars 16. The bar 27 in the specific embodiment shown in Fig. 5 is positioned at an angle alpha prime to the base which is, in the preferred instance, equal to the angle alpha. The holes 26 in the crosshead 3 are large enough to permit freedom of movement of the crosshead relative to the bar 27. Holes 26 may be lined with a composition bushing (not shown), e.g., fiber, rubber, nylon or the like, if desired. Such holes are small enough, however, to retain coil springs 30 and 31 suitably retained against washers 33 on either side of the hole 26.

Coil springs 30 and 31 form a critical part of the present invention. These springs are dimensionally and materially matched and opposed in their action, the crosshead 3 being disposed between the two springs 30 and 31. The matched opposed coil springs are supported in each case from the base 15 having their axes aligned or disposed in the same direction as by being threaded over a single straight rod 27 supported from the base 15. By "matched" is meant that these springs have the same natural frequency. This is achieved in coil spring design by making springs of the same number of turns, of a wire of substantially uniform diameter and composition and of the same length in the unstressed condition. The ends of these springs remote from the crosshead 3 are respectively carried against lock nuts 32 and washers 34 which may be adjusted to place the springs under compression. Although the device is operative when the springs are not under any significant compression, it is desired that each spring throughout its entire travel, as the crosshead 3 oscillates along the bar 27, shall be under some compression.

There are at each of the stations, for example, A, B and C shown in Fig. 1, a pair of bars 27 fitted with matched opposed coil springs 30 and 31 in the same manner as shown in Fig. 1 disposed on each side of the moving bed 2, making a total of six bars or rods 27 and twelve matched coil springs. This is a suitable number for a tubular trough 8 inches diameter and 8 feet long secured to a bed and fitted with hopper means such as shown in Fig. 1.

Also provided and shown in diagrammatic form in Fig. 2 and in greater detail in Fig. 5 is a supporting and guiding means 6. This portion of the device is adapted to carry the weight of the unit and to serve as a guide to maintain the unit in a single path. The device depicted in Fig. 1 moves in a direction coincident with the direction of the bar 27, the "throw" of the free piston in the vibration-inducing device 9 being also in that direction. The motion here imparted is for practical purposes unidirectional and will be referred to as such hereinafter. Of course, it is realized that the mechanism of the support 6 causes the device to travel along a truly arcuate path. However, the distance along such path is so relatively short that for all practical purposes, the path can be considered as a straight line.

With more particular reference to Fig. 5, there is also shown in cross-section a support and guide means generally indicated by the numeral 6. This is composed, in the preferred instance, of a rigid rectangular plate 35, e.g., a ⅛ inch steel plate, the upper and lower ends of which are carried in rather simple brackets 36 and 37 clamped, such as, by bolt means 38 to the respective brackets 5 and 20. One form of bracket 36 as illustrated in Fig. 5 is composed of a pair of rigid plates 39 and 40 having clamped therebetween by action of the bolt 38 a plastic receiving member 41 which may be, for example, a relatively rigid rubber or slotted nylon as a bearing. This allows for freedom of motion back and forth in a direction parallel to the axis of the rod 27, the flexible plastic bearing 41 serving as a suitable pillow for the rigid plate 35. It will be observed that this rather rigid structure directly interconnecting the movable bed 2 shown in dotted lines in Fig. 5 and the base 15 serves to support the weight of the moving bed, the trough 1, the vibrator 9, the bin 7 and all of the other attachments moving in response to the vibration-inducer 9 as well as the load carried by the device. The structure and arrangement of the guide support means is such that motion in any direction except in one substantially parallel to the axis of the rod 27 is prevented or minimized.

Although it has been found that the guide and support means will hold together as illustrated by virtue of the springs 30 and 31 and its collateral pair, not shown, it may be desired to use spring loaded spanner rods piercing the overhanging ends of the brackets 36 and 37 and adjacent each edge of the plate 35 to hold the guide and support means 6 together as a unit. Any suitable means for supporting the load may, however, be used.

It should also be specifically pointed out that such guide and support means will not be required in those instances where the moving portion of the equipment is light enough to be retained by the inherent rigidity of the bar 27 and the bearing of crosshead member 3 thereagainst in sliding contact. In such instances, the support and guide means 6 becomes unnecessary. However, in the usual industrial applications, the support and guide means is desirably and preferably separated from the energy storing and release means. Under the conditions of such separation, the sole function of the springs 30 and 31 is that of storing and releasing energy rather than supporting load. Thus, smaller springs may be used when the system contains supporting and guiding means 6 than would be required in the absence of such means 6 where the energy storing and release means 4 are required to serve the dual purpose. Where the device is constructed without support and guide means 6, because weight considerations so permit, the bars 27 and the unidirectional applied force serve to guide the direction of induced vibration along a substantially linear path.

The compression on the springs 30 and 31 can be regulated simply by closing down the lock nuts 32, i.e., shortening the distance between the operative ends 34 of the spring system. Because each crosshead 3 "floats" between the springs, only one such adjustment is needed on each side of the crosshead 3. The distance between the washers 34 at opposite ends of the rod 27 should be made as nearly equal as possible for all the spring systems, one pair at each of stations A, B and C. In this event, the compression on the springs in the entire system is substantially uniform, and each spring will operate at an efficiency which is substantially the same as that for all other springs. Thus, extraneous discordant forces are minimized.

Figure 7:
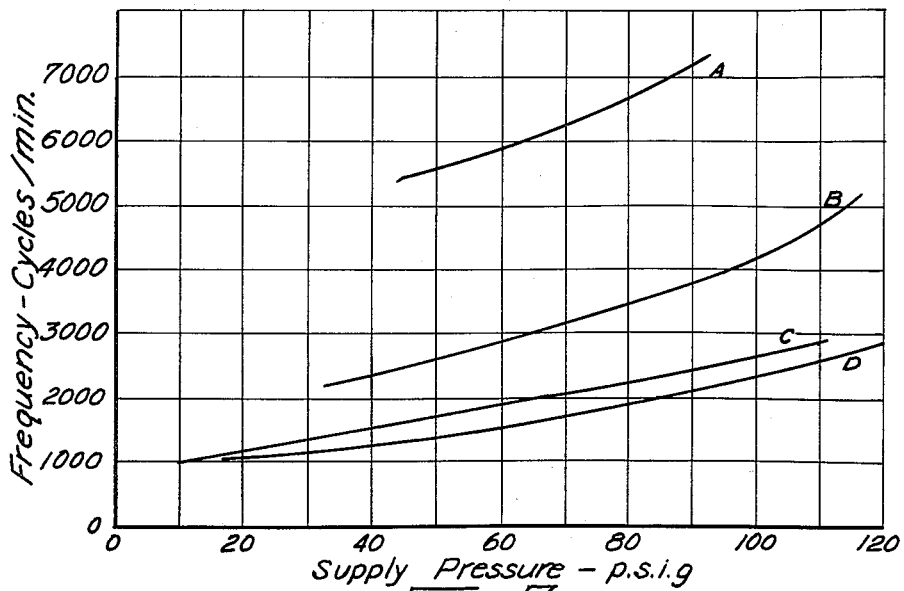
Fig. 7 is a graph showing the variation of frequency of certain pneumatic vibrators with gas supply pressure.

Fig. 3 is a diagrammatic sketch showing a source "S" of gas under pressure. The source "S" may be, therefore, an air compressor or a cylinder of compressed gas, e.g., air. Where fire is a hazard, inert gas, such as, carbon dioxide, nitrogen or helium may be used. The gas from the source "S" is carried through a throttling valve "VT" by which the pressure of the gas as delivered to the vibrator, so identified in Fig. 3, may be regulated within a reasonable range. Various means for controlling the pressure of the gas, and of which may be used in the present invention, are well known. Ordinarily the operating pressure for a device such as shown in Fig. 1 will range from about 20 up to as high as 150 lbs. per square inch gauge. Fig. 7 is a graph showing the variation of frequency of a vibration-inducing device with the supply pressure in lbs. per square inch gauge (p.s.i.g.).

Referring more particularly to Fig. 4, this is a reproduction of one of the figures in my co-pending application Ser. No. 641,326 filed Feb. 20, 1957, which was in turn a continuation-in-part of a co-pending application Ser. No. 346,204 filed April 1, 1953, now abandoned. The aforesaid pending application 641,326 describes and claims in detail pneumatic vibration-inducing devices useful in the present invention or driving the vibrated apparatus. The disclosure, therefore, of the aforesaid application of William H. Sterbentz and myself is hereby incorporated in the present application by reference thereto.

Briefly, however, there is shown in Fig. 4 a free piston 42 reciprocably carried in a cylinder 43. One end of the cylinder 43 is capped with a suitable plug 44 and the opposite end of the cylinder 43 is sealed with any suitable means 45 adapted to attach the vibration-inducing device to the object to be vibrated. One such form is shown in Fig. 4 as an eyelet 46 through which may be passed suitable anchoring means, not shown. Mounted within the casing 43 is a cylindrical piston 42, the sides of which are in sliding contact with the machined inside surface of the casing or cylinder 43. The piston 42 is mounted so as to provide for its reciprocating movement in an axial direction within the casing 43. The casing 43 is further provided with an inlet port 47 to permit the introduction of gas under pressure into the system. The inlet port 47 leads to a circularly grooved chamber 48 disposed between the piston 42 and the casing or cylinder 43 where the gas under pressure is directed alternately into ports 49 and 50 in the piston 42 which in turn carry the gas under pressure through ducts 51 and 52, respectively, to the end chambers 53 and 54, respectively, of the casing 43. Thus, as the piston 42 is driven in a reciprocating manner, the gas under pressure will alternately be directed to end chambers 53 and 54 of the casing 42. Following the direction of the gas into end chamber 53, the spent gas is then released to the atmosphere through the exhaust ports 55. Likewise, gas directed to end chamber 54 through duct 52 is released to the atmosphere through the ports 56.

In the embodiment shown in Fig. 4, the piston itself acts as a fast acting cut-off valve. This is accomplished by the critical location and size of the interior ducts 51 and 52 of the piston 42. Gas under pressure is introduced to the system through the inlet port 47 which leads to the circular chamber 48. When the piston 42 is slightly to the left of that illustrated in Fig. 4, circular chamber 48 is in contact with the opening 50 of duct 52. Thus, the gas under pressure flows through the duct 52 into end chamber 54 where such gas under pressure tends to force the piston 42 to the right. As the piston moves to the right, contact is established between circular chamber 48 and opening 49 of duct 51, and contact between the circular chamber 48 and the duct 52 is eliminated. Thus, gas under pressure commences flowing through duct 51 into end chamber 53, tending to decelerate the movement of piston 42 to the right. However, the momentum of the movement of the piston 42 to the right carries the piston 42 beyond the point where full contact between circular chamber 48 and duct 51 is established. The gas present in end chamber 53 is substantially sealed in that end chamber causing the pressure therein to build up greatly as the piston 42 continues to move to the right. Such increased pressure thus decelerates the movement of the piston to the right at an increased rate and then accelerates the movement of the piston to the left to complete the cycle.

Vibration-inducing devices of the type shown in Fig. 4 are of the quiet-action type because the compressed air which alternately builds up in the end chambers 53 and 54 serves as a cushion, and as the ducting is designed substantially in the manner shown in Fig. 4 hereof and more particularly described in the aforesaid application Ser. No. 641,326, impacting of the piston with the end caps 44 and 45 does not occur. Ordinary piston-cylinder clearances may be used in the construction of these pneumatic vibrators. The vibration-inducer used in the preferred embodiment shown in Figs. 1 and 2 was a 3 inch diameter steel piston, 7.75 inches long travelling in cylinder 9.75 inches between the inner faces of the cylinder end caps.

There has been described and illustrated, therefore, a vibrated member, namely, a vibratory conveyor. Any vibrated member may replace the conveyor type structure. For example, screens may be substituted for the conveyor trough. In like manner a test stand may be constructed by replacing the conveyor trough with a plate to which may be fixedly attached a test piece, such as, an aircraft instrument, to determine its resistance to vibration. The number of stations such as A, B and C is determined, of course, by the physical dimensions and requirements of the device. In certain instances, only one of these may be necessary; in others up to 10 or more such stations may be used.

There has also been described means interconnecting the fixed base with the vibrated member. Particularly described is that situation wherein the guiding and supporting means has been separated from the energy releasing and storage means. Also described is a special critical energy storing and releasing system composed of pairs of matched opposed coil springs, preferably under compression. The axes of these springs, in the best design, lie in a direction corresponding to the "throw" of the vibration-inducing device, and the vibrated member is suspended between the two opposed coil springs. Unidirectional operation is thus secured, and may in certain instances be further assured by the employment of guiding and supporting means where the weight demands of the apparatus are such as to make these means necessary. It should be pointed out that the "throw" of the vibration-inducer need not be parallel to the axes of the coil springs, provided unidirectional motion is otherwise insured. This is operable but poor design as only a component of the applied force is utilized.

There has also been described in some detail a pneumatic vibration-inducing device, preferably of the quiet action type and more particularly described in a prior application. One of the characteristic features of these pneumatic devices is that the frequency of vibration can be varied in response to variations in the pressure of the gas fed to the unit. This device is attached directly to the member to be vibrated.

By assembling these essential components in a manner such as illustrated in Figs. 1 and 2, rather unique results may be secured in the handling of industrially important materials.

In a preferred embodiment, therefore, the vibratable member, whether it be a conveyor trough on a bed, a screen, or a test stand surface, is disposed between a plurality of pairs of matched opposed coil springs all having the same natural frequency and all having their axes disposed in the same direction. Each of the pair of matched springs is preferably, although not essentially, axially aligned by having been threaded over a straight rod extending upwardly from the base. Two such rod and opposed spring sets on each side of the movable member constitutes in the usual case, a single energy storage and releasing station, e.g., A, B or C in Fig. 1. Separate guiding and supporting means are supplied when necessary, i.e., when the weight is too great for the coil springs to serve efficiently in a dual capacity. It is also preferred that the direction of "throw" of the variably frequency pneumatic vibration-inducer be parallel to that of the springs.

The springs used in the preferred embodiment of Fig. 1 had an O.D. slightly less than 0.75 inch. The wire size was 5/32 inch average diameter, and the springs were 4 inches long, made of chrome-vanadium. The natural frequency of these springs was approximately 1600 cycles per minute. The amplitude of vibration of the trough was from about 3/8 inch to about 1/2 inch. Rods 27 were 5/16 inch diameter rods 10 inches long, threaded at each end. Six rods of this size and 12 springs were used in the energy storage and release means. The tubular trough (8 inch diameter x 8 feet long), hopper, bed, crossheads, brackets, etc. including the 3 inch diameter vibration-inducer weighed about 150 lbs. empty. Three stations were found to give the desired amplitude for feeding at the proper rates.

Operation of such a device is secured simply by passing gas under pressure into the pneumatic vibrator 9, locating a natural frequency with the throttle valve by listening for it, and then introducing the material from the hopper 8.

Figure 6:
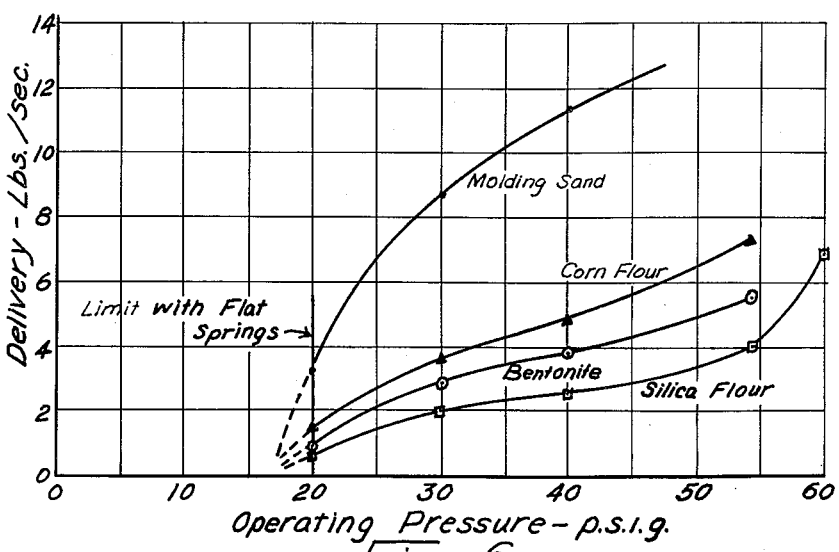
Fig. 6 is a graph showing performance specifications on certain bonding materials as a function of delivery versus operating pressure.

Fig. 6 is a graph showing the performance characteristics of several common materials referred to as "bonding materials." These include molding sand, cornflour, bentonite and silica flour. This data was obtained utilizing a device substantially as shown in Fig. 1 having three stations, A, B and C composed at each station of a pair of bars 27 each carrying a pair of matched opposed coil springs having interposed between adjacent ends thereof the cross heads 3. A guiding and supporting means as shown in Fig. 1 and more particularly shown in Fig. 5 was also employed. The tubular conveyor was 8 inches in diameter and 8 feet long. The vibration-inducing device carried a three inch diameter steel piston as above described. The cylinder was aluminum with a cast iron cylinder sleeve. The driving pressurized gas was air from a compressor. Material was fed in through a hopper such as shown at 8 in Fig. 1. The operating pressure was varied from 20 up to 60 lbs. p.s.i.g. Delivery was ascertained by weighing the amount of material carried through the conveyor in a given period of time. Silica flour is a very difficult material to convey by vibratory means. This difficulty is shown in Fig. 6 by the low delivery rate relative to molding sand. With the device of this invention above described, silica flour can be delivered indefinitely at a rate of about 12.5 tons per hour. This is a phenomenal delivery rate, when compared with what is obtainable using a flat spring suspended system. About the maximum delivery of silica flour which can be secured using flat springs for unlimited period of time with failure is about 1 lb. per second or about a ton and a half per hour with this tube. The vertical line in Fig. 6 at 20 p.s.i.g. is a limit for flat springs at unlimited usage levels. In other words, the operation is being conducted at a point where failure by fatigue will not be encountered for what appears to be an unlimited period of time. Fatigue is not a problem with the coil springs of the present device.

Fig. 7 is a graph showing the variation of frequency of certain pneumatic vibrators with the gas supply pressure. By varying the diameter of the piston, one can select almost any desired frequency range from something under 1,000 cycles per minute up to 7 or 8,000 cycles per minute. The curve identified as A is a 1 inch steel piston. The curves identified as B, C and D are 1.62 inch, 2.00 inch, and 3.00 inch pistons respectively. Curve D is obtained with the vibration-inducer of the specific embodiment and was used in obtaining the curves of Fig. 6.

One of the unusual features of devices made in accordance with the present invention is the remarkable change that is noted when natural frequency is encountered. As soon as the pressure has reached a point sufficient to drive the piston at a frequency coincident with the natural frequency of the coil springs, the sound of the equipment in operation usually abruptly changes and one can almost feel the device settle into a much smoother operation. For coil springs there may be a plurality of frequencies which apparently coincide with the natural frequencies of harmonics of the coil spring. When one plots for a given flat spring the magnification factor against the ratio of the impressed frequency and the natural frequency, there is obtained the characteristic curve for the spring which is asymptotic to the ratio 1:1 (natural frequency) both approaching and receding from this ratio of frequencies. In a coil spring at the various harmonic levels, there appear to be such natural frequencies for the various harmonics. This may be responsible for enabling utilization of a maximum amplitude and, therefore, a maximum delivery efficiency over an expanded range of frequencies. With an expanded range of frequencies, one can thus secure a much broader range of deliveries, all at substantially the most efficient point on the curve.

These results cannot be efficiently achieved with coil spring systems which have different characteristics due to differences in the springs. One spring of such a dissimilar system must necessarily act to some extent as a shock absorber, failing to return its maximum amount of energy since it must "fight" the other spring and since it must also necessarily be out of phase with such other spring. Leaf springs, as indicated, have but a single utilizable natural frequency and thus efficient operation can be secured at but a single point. Fatigue becomes a serious problem when one attempts to exceed the limits of leaf springs.

Another interesting phenomena which has been observed and which may be utilized with the coil spring system of the present invention and which is peculiar to this structure and differentiates it further from prior art structures is the following fact. Once the system has been put into natural frequency vibration by increasing the pressure applied up to the point where the sudden settling down or smoothing out of the operation is often audibly detected, the pressure applied may then be decreased, and the springs will exert a peculiar re-drive force upon the vibrator itself, tending to hold the whole system in a natural frequency. Thus, while a higher pressure may be required to place the system into natural frequency, when the system has once arrived at this point, the pressure may then be decreased, with consequent saving and the system maintained in natural frequency vibration. This is particularly important where there are likely to be variations in the line pressure where the demand for delivery is one calling for the most uniform continuous delivery. The spring system, therefore, will tend to act as its own regulator, smoothing out variations in line pressure and thus maintaining the delivery at a more nearly constant rate. Deliveries in the past have been of the magnitude of plus or minus 10% over a period of time. With the device of the present invention, accuracies to within about 1 to 2% have been secured.

Another unexpected result attainable with combinations of the type above described is greatly enhanced horizontal velocity of the material being conveyed. Whereas velocities of up to 120 inches per minute are obtained with certain of the prior art devices, velocities of up to about 600 inches per minute can be secured with devices in accordance with the present invention, or up to about 4 to 5 times the best heretofore realized.

Other modes of applying the principle of this invention may be employed instead of those specifically set forth above, changes being made as regards the details herein disclosed, provided the elements set forth in any of the following claims, or the equivalent of such be employed.

It is, therefore, particularly pointed out and distinctly claimed as the invention:

1. A unidirectional variable frequency vibratory drive apparatus comprising a vibratable member, a pressurized gas driven unidirectional free-piston vibration-inducing device supported on and attached directly to said vibratable member, and a base, said vibratable member having means for unidirectionally guiding it, and said vibratable member being disposed between pairs of matched opposed coil springs having the same natural frequency, the axes of which are disposed in the same direction, said springs being supported from the base.

2. A unidirectional variable frequency vibratory drive apparatus comprising a vibratable member, a pressurized gas driven unidirectional free-piston vibration-inducing device supported on and attached directly to said vibratable member, means for controlling the pressure of the gas fed to said device, and a base, said vibratable member having means for unidirectionally guiding it, and said vibratable member being disposed between pairs of matched opposed coil springs having the same natural frequency, the axes of which are disposed in the same direction, said springs being supported from the base.

3. A unidirectional variable frequency vibratory drive apparatus comprising a vibratable member, a pressurized gas driven unidirectional free-piston vibration-inducing device supported on and attached directly to said vibratable member, and a base, said vibratable member having means for unidirectionally guiding it, and said vibratable member being disposed between pairs of matched opposed coil springs having the same natural frequency, the axes of which are disposed in the same direction, each pair of such springs being retained in axial alignment on a straight bar extending from said base.

4. A unidirectional variable frequency vibratory drive apparatus comprising a vibratable member, a pressurized gas driven unidirectional free-piston vibration-inducing device supported on and attached directly to said vibratable member, and a base, means for unidirectionally guiding said vibratable member, said vibratable member being disposed between a plurality of pairs of matched opposed coil springs having the same natural frequency, the axes of which are disposed in the same direction, each pair of such springs being retained in axial alignment on a straight bar extending from said base, the direction of throw of said vibration-inducing device being substantially parallel to the direction of the axes of said springs.

5. A unidirectional variable frequency vibratory drive apparatus comprising a vibratable member, a pressurized gas driven unidirectional free-piston vibration-inducing device supported on and attached directly to said vibratable member, means for controlling the pressure of the gas fed to said device, and a base, means for unidirectionally guiding said vibratable member, said vibratable member being unidirectionally slideable with respect to a plurality of pairs of bars attached to and extending in the same direction from said base, and said vibratable member having means fixedly connected thereto disposed between a pair of matched opposed coil springs having the same natural frequency fitted over each of said bars.

6. A unidirectional variable frequency vibratory drive apparatus comprising a vibratable member having crosshead means attached thereto, a pressurized gas driven unidirectional free-piston vibration-inducing device supported on and attached directly to said vibratable member, means for controlling the pressure of the gas fed to said device, and a base, means for unidirectionally guiding and supporting said vibratable member, said crosshead means being unidirectionally slideable with respect to a pair of parallel bars attached to and extending from said base and through opposite extremities of said crosshead means, said crosshead means being disposed between a pair of axially aligned matched opposed coil springs of the same natural frequency fitted over each of said bars.

7. A unidirectional variable frequency vibratory drive apparatus comprising a vibratable member, having crosshead means attached thereto, a pressurized gas driven unidirectional free-piston vibration-inducing device supported on and attached directly to said vibratable member, means for controlling the pressure of the gas fed to said device, and a base, means for unidirectionally guiding and supporting said vibratable member, said crosshead means being unidirectionally slideable with respect to a pair of parallel bars attached to and extending from said base and through opposite extremities of said crosshead means, said crosshead means being disposed between a pair of axially aligned matched opposed coil springs of the same natural frequency fitted over each of said bars, the direction of throw of said vibration-inducing device being substantially parallel to the bars extending from said base.

8. A unidirectional variable frequency vibratory drive apparatus comprising a vibratable elongated trough having a plurality of spaced crossheads attached thereto, a pressurized gas driven unidirectional free-piston vibration-inducing device supported on and attached directly to said vibratable trough, means for controlling the pressure of the gas fed to said device, and a base, means for unidirectionally guiding and supporting said vibratable trough, each of said crossheads being unidirectionally slideable with respect to a pair of parallel bars attached to and extending from said base and through opposite extremities of said crossheads, said crossheads being disposed between a pair of axially aligned matched opposed coil springs of the same natural frequency fitted over each of said bars.

9. A unidirectional variable frequency vibratory drive apparatus comprising a vibratable elongated trough, a pressurized gas driven unidirectional free-piston vibration-inducing device supported on and attached directly to said vibratable elongated trough, the normal throw of said vibration-inducing device being disposed at an angle to said vibratable member and in a plane normal to the longitudinal axis of said vibratable trough, means for controlling the pressure of the gas fed to said device, and a base, said vibratable elongated trough having means for unidirectionally guiding it, and said vibratable elongated trough having attached thereto a plurality of regularly spaced crosshead means, each of said crosshead means being unidirectionally slideable with respect to a pair of parallel bars attached to and extending from said base and through opposite extremities of said crosshead means, and said crosshead means being disposed between a pair of axially aligned matched opposed coil springs of the same natural frequency fitted over each of said bars, said bars extending from said base in a direction parallel to the throw of said vibration-inducing device.

10. A unidirectional variable frequency vibratory drive apparatus comprising a vibratable member having crosshead means attached thereto, a pressurized gas driven unidirectional free-piston vibration-inducing device supported on and attached directly to said vibratable member, means for controlling the pressure of the gas fed to said device, and a base, means for unidirectionally guiding and supporting said vibratable member, said crosshead means being unidirectionally slideable with respect to a pair of parallel bars attached to and extending from said base and through opposite extremities of said crosshead means, said crosshead means being disposed between a pair of axially aligned matched opposed coil springs of the same natural frequency fitted over each of said bars, and means for maintaining each of said springs under compression.

11. A unidirectional variable frequency vibratory drive apparatus comprising a vibratable member, a pressurized gas driven unidirectional free-piston vibration-inducing device supported on and attached directly to said vibratable member, and a base, said vibratable member having means for unidirectionally guiding it, and said vibratable member being disposed between pairs of matched opposed coil springs having the same natural frequency, the axes of which are disposed in the same direction, said springs being supported from the base, and means for maintaining said springs under compression.

12. A unidirectional variable frequency vibratory drive apparatus comprising a vibratable elongated trough, a pressurized gas driven unidirectional free-piston vibration-inducing device supported on and attached directly to said vibratable elongated trough, the normal throw of said vibration-inducing device being disposed at an angle to said vibratable member and a plane normal to the longitudinal axis of said vibratable trough, means for controlling the pressure of the gas fed to said device, and a base, said vibratable trough having means for unidirectionally guiding it, and said vibratable elongated trough having attached thereto a plurality of regularly spaced crosshead means, each of said crosshead means being unidirectionally slideable with respect to a pair of parallel bars attached to and extending from said base and through opposite extremities of said crosshead means, and said crosshead means being disposed between a pair of axially aligned matched opposed coil spring of the same natural frequency fitted over each of said bars, said bars extending from said base in a direction parallel to the throw of said vibration-inducing device and means for maintaining said springs under compression.

13. A unidirectional variable frequency vibratory drive apparatus in accordance with claim 8 in which the means for unidirectionally guiding and supporting said vibratable trough comprises a pair of end brackets fixedly attached to the vibratable trough and to the base, respectively, a rigid plate member disposed between said brackets to maintain said end brackets in spaced relationship, and means carried by each of said brackets for resiliently engaging the ends of said rigid plate member respectively, whereby said plate is free to reciprocate through a small angle.

14. A unidirectional variable frequency vibratory drive apparatus in accordance with claim 13 in which the bracket engaging ends of said rigid plate member are each supported in slotted nylon bearings affixed to each of said brackets.

15. A vibratory conveyor comprising a vibratable elongated trough, a pressurized gas driven unidirectional free-piston vibration-inducing device supported on and attached directly to said elongated trough, the normal throw of said vibration-inducing device being disposed at an angle to said vibratable trough and in a plane normal to the longitudinal axis of said vibratable trough, means for controlling the pressure of the gas fed to said device and a base, said vibratable elongated trough being fitted with a plurality of crosshead members lying in planes respectively perpendicular to the throw of said pneumatic device, each of said crossheads being unidirectionally slideable with respect to a pair of parallel bars attached to and extending from said base through opposite extremities of each of said crossheads, and in a direction parallel to the throw of said vibration-inducing device, each of said crossheads being disposed between pairs of axially aligned matched opposed coil springs of the same natural frequency fitted over each of said bars, and each of said bars having means associated therewith for maintaining said springs under compression, and means for unidirectionally guiding and supporting said vibratable trough comprising a pair of end brackets fixedly attached to the elongated trough and the base, respectively, a relatively rigid plate member disposed between said brackets to maintain said brackets in spaced relationship, and means carried by each of said brackets for resiliently engaging the ends of said rigid plate member respectively, whereby said plate is free to reciprocate through a small angle.

16. A vibratory conveyor comprising a vibratable elongated trough, a pressurized gas driven unidirectional free-piston vibration-inducing device supported on and attached directly to said elongated trough, the normal throw of said vibration-inducing device being disposed at an angle to said vibratable trough and in a plane normal to the longitudinal axis of said vibratable trough, means for controlling the pressure of the gas fed to said device and a base, said vibratable elongated trough being fitted with a plurality of crosshead members lying in planes respectively perpendicular to the throw of said pneumatic device, each of said crossheads being unidirectionally slideable with respect to a pair of parallel bars attached to and extending from said base through opposite extremities of each of said crossheads, and in a direction parallel to the throw of said vibration-inducing device, each of said crossheads being disposed between pairs of axially aligned matched opposed coil springs of the same natural frequency fitted over each of said bars, and means for unidirectionally guiding and supporting said vibratable trough comprising a pair of end brackets fixedly attached to the elongated trough and the base, respectively, a relatively rigid plate member disposed between said brackets to maintain said brackets in spaced relationship, and means carried by each of said brackets for resiliently engaging the ends of said rigid plate member respectively, whereby said plate is free to reciprocate through a small angle.

References Cited in the file of this patent

UNITED STATES PATENTS

| | | |
|---|---|---|
| 1,810,882 | Heymann et al. | June 16, 1931 |
| 2,085,774 | Symons | July 6, 1937 |
| 2,678,720 | Brumagin | May 18, 1954 |
| 2,684,754 | Bankauf et al. | July 27, 1954 |
| 2,830,696 | Musschott | Apr. 15, 1958 |
| 2,854,130 | Adams | Sept. 30, 1958 |
| 2,868,357 | Thomas | Jan. 13, 1959 |